United States Patent [19]

Gupta et al.

[11] Patent Number: 5,702,819
[45] Date of Patent: Dec. 30, 1997

[54] COMPOSITE LENSES

[75] Inventors: Amitava Gupta; Ronald D. Blum; Venkatramani S. Iyer; Paul J. Nagg, all of Roanoke, Va.

[73] Assignee: Innotech, Inc., Roanoke, Va.

[21] Appl. No.: 649,354

[22] Filed: May 17, 1996

Related U.S. Application Data

[60] Continuation of Ser. No. 545,065, Oct. 19, 1995, which is a division of Ser. No. 214,506, Mar. 18, 1994, Pat. No. 5,512,371.

[51] Int. Cl.[6] .................................................. B32B 27/36
[52] U.S. Cl. ..................... 428/412; 428/522; 264/1.7; 264/1.8
[58] Field of Search ................... 264/1.7, 1.8; 428/412, 428/522

[56] References Cited

U.S. PATENT DOCUMENTS

| | | | |
|---|---|---|---|
| 3,673,055 | 6/1972 | Sheld | 428/412 |
| 3,763,290 | 10/1973 | Sheld | 264/1.7 |
| 4,191,790 | 3/1980 | Chung et al. | 427/164 |
| 4,291,097 | 9/1981 | Kamada et al. | 428/412 |
| 4,386,042 | 5/1983 | Tatebayashi | 264/135 |
| 4,425,403 | 1/1984 | Taniguchi et al. | 428/331 |
| 4,544,572 | 10/1985 | Sandvig et al. | 427/492 |
| 4,637,904 | 1/1987 | Rounds | 264/1.38 |
| 4,758,448 | 7/1988 | Sandvig et al. | 351/166 |
| 4,904,525 | 2/1990 | Taniguchi et al. | 428/328 |
| 4,954,591 | 9/1990 | Belmares | 526/264 |
| 5,219,497 | 6/1993 | Blum | 264/1.38 |
| 5,512,371 | 4/1996 | Gupta | 428/412 |
| 5,531,940 | 7/1996 | Gupta et al. | 264/1.7 |

OTHER PUBLICATIONS

Patent Abstracts Of Japan, vol. 6, No. 94, 2 Jun. 1982 & JP-A-57 023611 (Seiko Epson Corp), 6 Feb. 1982.

*Primary Examiner*—Leszek Kiliman

[57] ABSTRACT

A method for making improved optical quality lenses is described which includes arranging a mold having a molding surface, a curable optical quality resin composition, and a plastic lens preform of optical quality material such that the resin composition is disposed between, and in contact with, the plastic lens preform and the mold; upon curing, the resin composition forms a cured plastic attached portion that is bonded to the plastic lens preform. The resin composition and plastic lens preform are selected such that the attached portion has a higher scratch resistance, a lower chromatic aberration, and/or a higher ease of edging than the lens preform.

29 Claims, 1 Drawing Sheet

COMPOSITE LENSES

This is a continuation of application Ser. No. 08/545,065 filed 19 Oct. 1995, now pending, which is a division of application Ser. No. 08/214,506 filed 18 Mar. 1994, now U.S. Pat. No. 5,512,371.

FIELD OF THE INVENTION

The present invention relates to methods for quickly and inexpensively producing impact and scratch resistant lenses with low chromatic aberration that are lightweight and can be edged using conventional edging equipment.

BACKGROUND OF THE INVENTION

In manufacturing lenses, plastics are often desirable as construction materials due to their light weight and durability. Plastic lenses also provide relatively economical vision correction. Methods for producing plastic lenses of various prescriptions are well known.

As used herein a "plastic" lens is one fashioned from optical quality resin materials. Prevalent materials for use in fashioning plastic lenses include resin mixtures containing allyl diglycol carbonates, such as "CR-39" sold by PPG Industries. Materials based on allyl diglycol carbonates are advantageous in that they are relatively scratch resistant; they have relatively low chromatic aberration (i.e., they have Abbe numbers of around 58); and they can be easily edged with conventional edging equipment typically found in small lensmaking operations, for example, to fit a predetermined eyeglass frame (this characteristic will hereinafter be referred to as greater or lesser "ease of edging"). However, lens materials based on allyl diglycol carbonates are disadvantageous in that they must be relatively thick in order to provide necessary impact resistance.

Bisphenol A polycarbonates provide significantly higher impact resistance than allyl diglycol carbonates. These materials, however, are disadvantageous in that: (1) they are scratch prone; (2) they have relatively high chromatic aberration (i.e., they have Abbe numbers of around 28); and (3) they are prone to flow during edging due to their relatively low degree of crosslinking, causing conventional edging equipment to rapidly "gum up" and preventing a sharp edge from being formed.

In view of the above, it can be appreciated that there is a need in the lensmaking art for a plastic lens material that provides the impact resistance of bisphenol A polycarbonates, while at the same time providing the relatively high scratch resistance, relatively low chromatic aberration, and relatively high ease of edging of allyl diglycol carbonates.

SUMMARY OF THE INVENTION

Accordingly, applicants have provided a novel method for providing a new plastic lens having the above features.

According to an embodiment of the invention, a method for making composite plastic optical quality lenses includes the step of arranging a mold, a curable optical quality resin composition and a plastic lens preform in a fashion such that the resin composition is disposed between, and in contact with, the plastic lens preform and the mold. The resin is then cured to form a cured plastic attached portion that is bonded to the plastic lens preform.

The plastic lens preform and the resin are preferably selected such that the resin composition has one or more of the following characteristics with respect to the resin compostion, once the resin composition is cured: (1) a higher scratch resistance, (2) a lower chromatic aberration, and (3) a greater ease of edging. The resin composition is also preferably capable of forming an adhesive interface with at least the first face of the plastic lens preform. Moreover, the resin composition preferably has a polymerization shrinkage of less than 12%. Finally, the surface energy of the resin and the surface energy of the preform are preferably within 10% of each other. The face of the preform to which the resin is attached can be either the convex face or the concave face.

According to various embodiments, the molding surface and the first face are configured such that: (1) the cured plastic attached portion comprises a non-prescription carrier layer; (2) the cured plastic attached portion comprises a non-prescription carrier layer and a prescription segment; (3) the cured plastic attached portion comprises a prescription carrier layer; or (4) the cured plastic attached portion comprises a prescription carrier layer and a prescription segment. The prescription segment can correspond, for example to a bi-focal, multi-focal or progressive region.

According to another embodiment of the invention, a plastic lens preform material is provided that includes an aromatic polycarbonate polymer. This plastic lens preform material is provided in connection with a curable optical quality resin composition comprising (a) a first resin portion comprising a bisallyl carbonate and (b) a second resin portion selected from the group consisting of multifunctional acrylates, methacrylates, and a mixture of multifunctional acrylates and methacrylates.

According to yet another embodiment of the invention, the aromatic polycarbonate polymer has a refractive index of about 1.5 to 1.6 and an Abbe number of about 28 to 40. At the same time, the resin composition has a refractive index within about 0.05 units of the refractive index of the aromatic polycarbonate polymer and has an Abbe number of about 40 to 60.

An advantage of the above embodiments, is that they can be used to provide a new composite optical lens that maximizes the advantageous attributes of the materials used in the construction of the lens, while minimizing the detrimental aspects of these materials.

For example, the superior impact resistance of bisphenol A polycarbonate and the excellent scratch resistance and low chromatic aberration of allyl diglycol carbonates can be emphasized in composite lenses of the invention. At the same time, the poor impact resistance of allyl diglycol carbonates and the poor scratch resistance, chromatic aberration and ease of edging of bisphenol A polycarbonates can be deemphasized.

Various other advantages of the methods of the present invention and lenses made thereby will be evident from the detailed description of certain embodiments below.

BRIEF DESCRIPTION OF THE FIGURES

The relative thickness of various components is exaggerated in the Figures for the purpose of illustration.

DETAILED DESCRIPTION OF THE INVENTION

Figure 1:
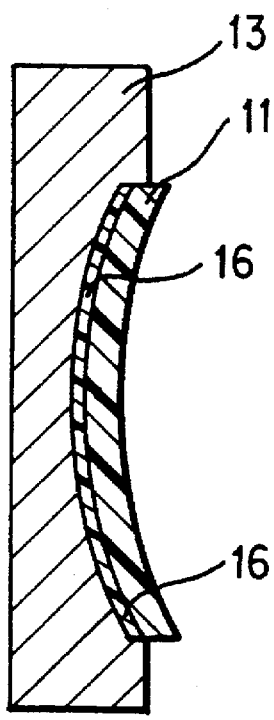
FIG. 1 is a cross-sectional view of an assembly that includes a mold, a resin and a lens preform in accordance with an embodiment of the present invention. The assembly is designed to provide a thin carrier layer of resin on the lens preform surface.

According to an embodiment of the present invention, a method for making a finished lens is described which utilizes the following: a mold; a curable optical quality polymer resin composition; and a plastic lens preform having a predetermined lens correction at its optical center. The plastic lens preform and the resin composition are selected such that, when cured, the resin composition has a higher scratch resistance, a lower chromatic aberration, and/or a greater ease of edging than the lens preform. The finished lens may be spherical or aspheric in geometry and may be monofocal, bifocal, multifocal or progressive in optical characteristics.

Typical materials used for molds in accordance with the present invention include molds of uv-transparent plastic materials, glass molds such as those made from Crown glass, and metal molds such as those made from electro-formed nickel. However, practically any material can be used so long as the material provides for proper wetting characteristics with respect to the uncured resin composition, provides for proper release characteristics after the resin composition has been cured, and is compatible with the specific cure process utilized. Preferred mold materials for the practice of the present invention are crown glass or uv-transparent plastic materials. Means for making appropriate molds and for fashioning such molds for use in accordance with the present invention are well known in the art.

The plastic lens preform of the present invention is selected to provide high impact-resistance to the resulting lens. In accordance with an embodiment of the present invention, preferred polymers for use as plastic lens preforms are aromatic polycarbonate polymers. More preferred polymers are bisphenol A polycarbonate, ortho-methoxy bisphenol A polycarbonate, and α,α'-dichloro bisphenol A polycarbonate, with the most preferred material for use in connection with the present invention being bisphenol A polycarbonate. Bisphenol A polycarbonate is commercially available in the form of finished or semi-finished single vision lens preforms from Gentex Corporation. Bisphenol A polycarbonate has a high impact resistance, a refractive index of about 1.57 and an Abbe number of about 28–30.

As noted above, the lens preform material of the present invention is selected to provide excellent impact resistance. Such materials, however, often have less-than-excellent characteristics in the areas of scratch resistance, chromatic aberration, and ease of edging. Nonetheless, applicants have unexpectedly found that these potential deficiencies can be overcome by providing the lens preform with a layer of curable optical quality resin with the desired characteristics.

According to an embodiment of the present invention, preferred curable optical quality resin compositions contain: (1) bisallyl carbonate and (2) methacrylate, acrylate, or a combination of methacrylate and acrylate.

Preferred bisallyl carbonates for use in the resin of the present invention include diethylene glycol bisallyl carbonate (such as CR39 sold by PPG Industries) and bisphenol A bisallyl carbonate (sold by PPG as HIRI).

Preferred acrylates include multi-functional acrylates such as diacrylates, triacrylates, tetraacrylates, and pentacrylates including ethylene glycol diacrylate, ethoxylated aliphatic diacrylate (such as CD9209 sold by Sartomer), ethoxylated trimethylol propane triacrylate (such as 9008 sold by Sartomer), pentaerythritol tetraacrylate (such as SR399 sold by Sartomer), di-pentaerythritol pentacrylate, and bisphenol A diacrylate.

Preferred methacrylates are methyl and allyl methacrylate and bisphenol A dimethacrylate.

The curable optical quality resin compositions of the present invention also preferably include a thermal initiator (such as diisopropyl peroxydicarbonate, which can be obtained from PPG as Trigonox), an ultraviolet initiator (such as 2-hydroxy-2-methyl-1-phenyl-propan-1-one or 1-hydroxycyclohexylphenyl ketone, which can be obtained from Ciba Geigy as Irgacure 184 and Duracure 1173, respectively), or both.

According to a preferred embodiment, resin compositions of the present invention include the following formulations: (1) about 0.5 to 8 weight % photoinitiator; (2) about 25 to 85 weight % bisallyl carbonate; and (3) the remainder methacrylate, multi-functional acrylate or a mixture of methacrylate and multi-functional acrylate. More preferred optical quality resin compositions include: (1) about 1 to 5 weight % photoinitiator; (2) about 50 to 85 weight % bisallyl carbonate; and (3) the remainder methacrylate, multi-functional acrylate or a mixture of methacrylate and multi-functional acrylate.

The above resin compositions preferably have a refractive index of about 1.52 to 1.61 (i.e., within about 0.05 units of bisphenol A polycarbonate).

The resin material compositions of the invention may also contain various other additives which will alter the resulting lens including, without limitation, dyes to correct color balance, photochromic additions, and fillers to alter viscosity and rheology.

Before curing, the resin composition, the plastic lens preform and the mold are arranged such that the resin composition is disposed between the plastic lens preform and the mold and such that the resin composition is in contact with at least a portion of the plastic lens preform and the mold.

Using the principles discussed in connection with FIGS. 1 and 2 to follow, a myriad of lens configurations can constructed including monofocal, bifocal, multifocal or progressive lenses of spherical or aspheric geometry. Although preferably applied to the front lens surface, the attached portion can also be applied to the back lens surface or both the back and front lens surfaces using the methods of the present invention. In addition, convex or concave surfaces can be treated. Fractional portions of a surface can also be treated, if desired.

Referring now to the embodiment shown in FIG. 1, a non-prescription carrier layer 16 of the optical quality resin composition is arranged between mold 13 and lens preform 11. The curvature of the surface of the mold 13 is preferably matched to the curvature of the surface of the lens preform 11 such that the carrier layer 16 will be of substantially uniform thickness and unwanted optical effects associated with the non-prescription carrier layer 16 will be minimized.

Figure 2:
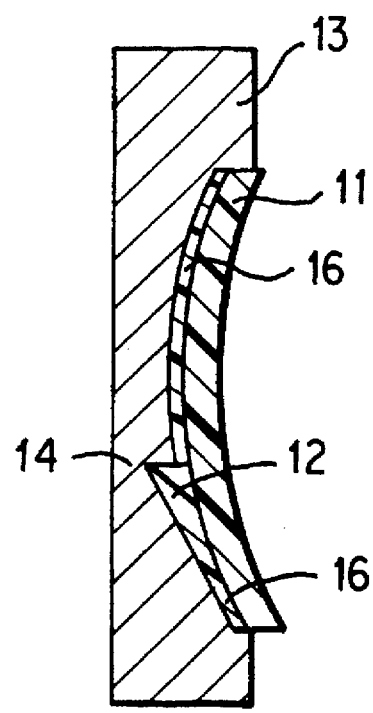
FIG. 2 is a cross-sectional view of an assembly that includes a mold, a resin and a lens preform in accordance with an embodiment of the present invention. The assembly is designed to provide a thin carrier layer and a bifocal segment on the lens preform surface.

Referring now to FIG. 2, if a prescription segment, such as bifocal segment 12, is to be added, then a cavity 14 can be established in the mold 13. A sufficient amount of resin should be provided in the mold 13 to fill the cavity 14, which defines bifocal segment 12, and to establish a non-prescription carrier layer 16. As above, the non-prescription carrier layer 16 is sufficiently thin and uniform to ensure that the non-prescription carrier layer 16 does not change the distance prescription of the lens preform in the area adjacent to the bifocal segment 12.

Other embodiments will become readily apparent to the skilled in the art. For example, a prescription carrier layer can be used in place of the non-prescription carrier layer 16 in FIGS. 1 and 2. In still other embodiments, the prescription segment and carrier layer can be cast separately. Moreover, the surface of the lens preform can be altered, for example: to convert the lens preform into a progressive lens; to provide a seamless multifocal, bifocal or trifocal lens; or to induce prismatic effects in the finished lens. The methods of the present invention can also be used for properly orienting the optical center of the lens with respect to the multifocal or progressive region. They can also be used to cast compensating base-down prism in conjunction with casting a progressive lens. In some lens designs adjustments must be made to accommodate astigmatism in the prescription of the finished resulting lens. Additional details enabling one skilled in the art to practice such embodiments are described, for example, in U.S. Pat. No. 5,219,497, the disclosure of which is hereby incorporated by reference.

In practicing various embodiments of the method of the present invention, the lens preform, the resin, and the mold may be assembled: (a) after the resin composition is placed onto the lens preform, (b) after the resin composition is placed onto the mold, or (c) before the resin composition is applied to either component (i.e., the resin composition is dispensed into a cavity formed by the mold and the lens preform).

One way by which the mold and lens preform can be assembled before the resin is applied to either component is by injecting the resin material between the mold and lens preform, preferably by means of a channel in the mold, while taking care to prevent formation of air pockets within the cavity. Any burrs or other artifacts resulting from the presence of such a channel or other structures can then be removed during finishing of the resulting lens.

According to a preferred embodiment for the practice of the invention, the resin is placed onto the mold prior to assembly of the mold and lens preform.

Once the mold, resin and lens preform are arranged, the prescription segment and/or carrier layer (such as the non-prescription carrier layer 16 and bifocal segment 12 shown in FIG. 2) are cured such that they harden and bond to the lens preform. During the curing process, the mold and lens preform may be held together, among other means, by peripheral clamping around the extreme periphery of the lens preform and the mold, by a conventional optical gasket which holds the lens preform and mold together, by the force provided by the weight of the lens preform when it is placed on top of the mold, by capillary attraction resulting from a very thin film of resin material between the mold and lens preform (i.e., the carrier layer), or by a combination thereof.

Preferred embodiments of the present invention, however, do not require use of a conventional optical gasket. This promotes more versatile and flexible casting and makes such methods significantly more economical than traditional casting methods which employ conventional optical gaskets. In some such embodiments, molding material is dispensed into the mold, without the use of conventional optical gaskets. Then, the lens preform is placed on top of the resin. The mold and lens preform are held together by capillary attraction of the resin layer, by weight and/or by other means. In this manner, a thin carrier layer of material is cast over the surface of the lens preform, in addition to any segment or other optic surface defined by the mold, without the use of a conventional optical gasket.

The resin material may be cured in any manner appropriate for the specific composition of such material including ultraviolet, thermal, ultrasound, infrared, microwave and other forms of radiation. Thermal and ultraviolet curing methods are preferred.

Ultraviolet curing is typically achieved in connection with an ultraviolet light source. Suitable ultraviolet light sources include those manufactured by Phillips Corporation and identified as TL/10R/UVA reflector lamps, PL9W/10 lamps, HPM high pressure halide lamps, HPA medium pressure metal halide lamps and HPR high pressure mercury vapor lamps. In preferred embodiments, the resin is exposed to an ultraviolet source (i.e., a source emitting radiation in the range of about 300–450 nm) during the curing process until the resin sufficiently hardens (i.e., approximately 5–30 minutes). Other appropriate ultraviolet light sources and conditions for exposure will depend upon the resin composition employed and will be apparent to those skilled in the art. Ultraviolet curing can also be performed using a "blinking" ultraviolet light source. Curing with a blinking source may produce an optical segment with less variation in consistency.

Ultraviolet curing, unlike thermal curing, requires at least one ultraviolet-radiation-transparent surface through which the ultraviolet radiation can travel to reach the resin material. Although the lens preform provides one transparent surface, forming the mold from an ultraviolet-radiation-transmitting material, such as Crown glass, will provide an additional transparent surface and can promote faster, more even curing. If ultraviolet light is to be provided only through the lens preform, a reflective surface (such as a metallized surface) can be provided in connection with the mold to reflect ultraviolet light back through the resin material being cured. The reflective surface is preferably highly polished to efficiently reflect ultraviolet light rays from the ultraviolet light source. The reflective surface is also preferably conformed with the casting surface of the mold. The reflective surface may act directly as a casting surface that produces an optical quality lens surface or may be fixed beneath a transparent layer which acts as the actual casting surface of the mold.

Thermal curing is typically achieved by heating the resin material to a predetermined temperature for a predetermined time. Heat is preferably applied to the resin material by means of a heated air or liquid bath. Curing conditions typically include temperatures in the range of about 80° to 200° F. for periods of about 30 to 600 minutes. Preferred mold materials for use in connection with thermal curing include rigid insert materials such as glass or metal.

Some materials can be cured by a combination of heat and ultraviolet light, either applied sequentially or simultaneously. For example, a resin material containing both a thermal initiator and a ultraviolet initiator can be placed into the resin subjected to thermal curing using a heated fluid bath (preferably 150°–180° F.) for a short period of time (preferably about 20 minutes) such that the heat activates the thermal initiator and forms the lens material mixture into a gel which freezes the photosensitive initiator in place throughout the lens material. This gelled state preestablishes the optical framework needed for an optical lens relatively free of optical distortion or imperfections. After the lens material mixture has sufficiently gelled, it can then be subjected to ultraviolet light to activate the photosensitive initiator and complete the curing process to form the finished lens.

Separation of the mold from the resultant lens can be facilitated by contacting the assembled apparatus with ice or with some other cold source (e.g., freon). The exposure to cold causes the resultant lens and mold to contract, pulling the lens and mold away from each other such that the components can be more easily separated. Although more traditional separation methods using a water bath can be used, separation with a cold source eliminates the need to remove water from the resultant lens and molds before further operations can be performed.

After the initial curing step, all or a portion of the lens can be subjected to "post curing" if any additional hardening is required. Details allowing one skilled in the art to post cure the lenses of the present invention are discussed, for example, in U.S. Pat. No. 5,219,497.

In many instances, it may be desirable to provide lenses with various characteristics that are not inherent to the specific lens preform and resin materials used. One method for introducing supplementary characteristics to the lenses of the present invention is by the addition of, for example, anti-reflective additives, scratch-resistant additives, tinting additives, wavelength absorbing/transmitting additives, and so forth. Techniques for including such additives include dispersing the additives throughout the resin prior to cure (where appropriate), providing a two-part cure wherein a resin layer containing the additive of interest is cured separately from a resin layer that does not contain such additives, immersing cured lenses into a solution containing the additives, and so forth.

For example, after curing, the lens can be modified to include ultraviolet inhibitors. Ultraviolet inhibitors are provided, for instance, to avoid any additional effects of ultraviolet radiation on the ultraviolet initiators (if any) and to substantially prevent or entirely eliminate the transmission of ultraviolet light waves into the lens. Such ultraviolet inhibitors are well known in the art and need not be described in detail herein. It is desirable to have the ultraviolet inhibitor eliminate all ultraviolet light and other wavelengths having a wavelength of 500 nm or less, more specifically between 300–425 nm. Ultraviolet inhibitors can be provided, for example, by simply dipping the cured lenses into a hot bath containing an ultraviolet-light-inhibiting additive to coat the surfaces sufficiently such that the entire surface of the lens is coated with the inhibitor or such that the additive is absorbed into the surface of the lens.

Some additives are desirably dispersed throughout the resin material. If so, the additive can be provided throughout the resin prior to the initial cure. If the additives need only be applied to a surface layer of the lenses, additives can preferably be applied by providing a two part cure, wherein a resin layer containing the additives of interest is cured separately from a resin layer that does not contain such additives. According to one preferred embodiment, coatings are provided on the resultant lens by transferring coatings from the mold to the resultant lens. In such embodiments, the mold is first coated with a thin layer of resin and the material to be transferred to the lens (e.g., such as the anti-scratch, anti-reflective, photosensitive or anti-scratch coatings) and cured to a gel state. The coated mold can then be employed in the casting process as disclosed above. Once cured, the additive-containing coating will be transferred to the surface of the resultant lens, so long as the coating material has a greater affinity for the lens resin material than for the mold surface. In this way, the additive is applied to a thin layer on the surface of the lens, without the need for a dipping step.

Certain embodiments of the present invention are demonstrated by the following examples which are intended as illustrations and not as limiting the invention in any way.

EXAMPLE 1

A mold is fashioned to define the contours of a bifocal segment and a carrier layer. The mold is made from Crown glass.

An optical resin material is then prepared consisting of 82 weight % diethylene glycol bisallyl carbonate (sold by PPG as CR39), 10 weight % ethoxylated aliphatic diacrylate (sold by Sartomer as CD9209), 4 weight % ethoxylated triacrylate (sold by Sartomer as 9008) and 4 weight % 2-hydroxy-2-methyl-1-phenyl-propan-1-one (sold by Ciba Geigy as Duracure 1173).

The resin mixture is then dispensed into the mold. A lens preform made from polycarbonate of bisphenol A is placed on top of the resin-filled mold and slight pressure is applied to squeeze out excess resin material until a carrier layer of sufficient thickness is obtained. The weight of the lens preform and capillary action of the resin material are sufficient to hold the assembly together without use of a conventional optical gasket.

The resin material is then cured through both the lens preform and the mold using an ultraviolet source manufactured by Phillips Corporation and identified as a PL9W/10 lamp until the resin hardens sufficiently (approximately 10–20 minutes). The mold and unfinished lens are then separated. The unfinished lens is then edged, finished and mounted.

EXAMPLE 2

A lens is made as described in Example 1 with the exception that 10 weight % bisphenol A diacrylate is added. To compensate for this addition, 72 weight % diethylene glycol bisallyl carbonate is used, rather than the 82 weight % of Example 1.

What is claimed is:

1. A composite plastic optical quality lens, comprising:
   a plastic lens preform portion of optical quality material; and
   a cured plastic attached portion of a resin composition that is bonded to said plastic lens preform portion, said cured plastic attached portion having higher scratch resistance than said plastic lens preform portion, and said resin composition having a refractive index within about 0.05 units of the refractive index of said plastic lens preform portion.

2. The composite plastic optical quality lens of claim 1 wherein said cured plastic attached portion comprises a non-prescription carrier layer.

3. The composite plastic optical quality lens of claim 1 wherein said cured plastic attached portion comprises a non-prescription carrier layer and a prescription segment.

4. The composite plastic optical quality lens of claim 1 wherein said cured plastic attached portion comprises a prescription carrier layer.

5. The composite plastic optical quality lens of claim 1 wherein said cured plastic attached portion comprises a prescription carrier layer and a prescription segment.

6. The composite plastic optical quality lens of claim 3 wherein said prescription segment corresponds to a bi-focal, multi-focal or progressive region.

7. The composite plastic optical quality lens of claim 1, further comprising an additional scratch-resistant layer on the surface of said preform portion, said cured plastic attached portion, or both.

8. The composite plastic optical quality lens of claim 1 wherein said plastic lens preform portion comprises an aromatic polycarbonate polymer; and said cured plastic attached portion comprises (a) a first resin portion comprising a bisallyl carbonate and (b) a second resin portion selected from the group consisting of one or more multi-functional acrylates, one or more methacrylates, and a mixture of one or more multi-functional acrylates and one or more methacrylates.

9. The composite plastic optical quality lens of claim 8, wherein said cured plastic attached portion comprises about 0.5 to 8 weight % photoinitiator; about 25 to 85 weight % bisallyl carbonate; and a remainder selected from the group consisting of methacrylates, one or more multi-functional acrylates, and a mixture of one or more methacrylates and one or more multi-functional acrylates.

10. The composite plastic optical quality lens of claim 8, wherein said cured plastic attached portion comprises about 1 to 5 weight % photoinitiator; about 50 to 85 weight % bisallyl carbonate; and a remainder selected from the group consisting of one or more methacrylates, one or more multi-functional acrylates, and a mixture of one or more methacrylates and one or more multi-functional acrylates.

11. The composite plastic optical quality lens of claim 9 wherein said photoinitiator is selected from the group consisting of 2-hydroxy-2-methyl-1-phenyl-propan-1-one and 1-hydroxycyclohexylphenyl ketone.

12. The composite plastic optical quality lens of claim 8, wherein said aromatic polycarbonate polymer is selected from the group consisting of bisphenol A polycarbonate, ortho-methoxy bisphenol A polycarbonate and $\alpha,\alpha'$-dichloro bisphenol A polycarbonate.

13. The composite plastic optical quality lens of claim 8, wherein said bisallyl carbonate is selected from the group consisting of diethylene glycol bisallyl carbonate and bisphenol A bisallyl carbonate.

14. The composite plastic optical quality lens of claim 8, wherein said multi-functional acrylates are selected from the group consisting of ethylene glycol diacrylate, ethoxylated trimethylol propane triacrylate, pentaerythritol tetracrylate, di-pentaerythritol pentacrylate and ethoxylated aliphatic diacrylate; and said methacrylates are selected from the group consisting of methyl methacrylate, allyl methacrylate, and bisphenol A dimethacrylate.

15. The composite plastic optical quality lens of claim 1, wherein said aromatic polycarbonate polymer has a refractive index of about 1.5 to 1.6.

16. A composite plastic optical quality lens comprising:

a plastic lens preform portion comprising an aromatic polycarbonate polymer; and a cured plastic attached portion of a resin composition comprising (a) a first resin portion comprising a bisallyl carbonate and (b) a second resin portion selected from the group consisting of one or more multi-functional acrylates, one or more methacrylates, and a mixture of one or more multi-functional acrylates and one or more methacrylates; said cured plastic attached portion having higher scratch resistance than said plastic lens preform portion, and said resin composition having a refractive index within about 0.05 units of the refractive index of said plastic lens preform portion.

17. The composite plastic optical quality lens of claim 16 wherein said cured plastic attached portion comprises a non-prescription carrier layer.

18. The composite plastic optical quality lens of claim 16 wherein said cured plastic attached portion comprises a non-prescription carrier layer and a prescription segment.

19. The composite plastic optical quality lens of claim 16 wherein said cured plastic attached portion comprises a prescription carrier layer.

20. The composite plastic optical quality lens of claim 16 wherein said cured plastic attached portion comprises a prescription carrier layer and a prescription segment.

21. The composite plastic optical quality lens of claim 16 wherein said prescription segment corresponds to a bi-focal, multi-focal or progressive region.

22. The composite plastic optical quality lens of claim 16, further comprising an additional scratch-resistant layer on the surface of said preform portion, said cured plastic attached portion, or both.

23. The composite plastic optical quality lens of claim 16, wherein said cured plastic attached portion comprises about 0.5 to 8 weight % photoinitiator; about 25 to 85 weight % bisallyl carbonate; and a remainder selected from the group consisting of methacrylates, one or more multi-functional acrylates, and a mixture of one or more methacrylates and one or more multi-functional acrylates.

24. The composite plastic optical quality lens of claim 16, wherein said cured plastic attached portion comprises about 1 to 5 weight % photoinitiator; about 50 to 85 weight % bisallyl carbonate; and a remainder selected from the group consisting of one or more methacrylates, one or more multi-functional acrylates, and a mixture of one or more methacrylates and one or more multi-functional acrylates.

25. The composite plastic optical quality lens of claim 23, wherein said photoinitiator is selected from the group consisting of 2-hydroxy-2-methyl-1-phenyl-propan-1-one and 1-hydroxycyclohexylphenyl ketone.

26. The composite plastic optical quality lens of claim 16, wherein said aromatic polycarbonate polymer is selected from the group consisting of bisphenol A polycarbonate, ortho-methoxy bisphenol A polycarbonate and $\alpha,\alpha'$-dichloro bisphenol A polycarbonate.

27. The composite plastic optical quality lens of claim 16, wherein said bisallyl carbonate is selected from the group consisting of diethylene glycol bisallyl carbonate and bisphenol A bisallyl carbonate.

28. The composite plastic optical quality lens of claim 16, wherein said multi-functional acrylates are selected from the group consisting of ethylene glycol diacrylate, ethoxylated trimethylol propane triacrylate, pentaerythritol tetracrylate, di-pentaerythritol pentacrylate and ethoxylated aliphatic diacrylate; and said methacrylates are selected from the group consisting of methyl methacrylate, allyl methacrylate, and bisphenol A dimethacrylate.

29. The composite plastic optical quality lens of claim 16, wherein said aromatic polycarbonate polymer has a refractive index of about 1.5 to 1.6.

* * * * *